United States Patent
Junkkari et al.

(10) Patent No.: US 11,365,349 B2
(45) Date of Patent: Jun. 21, 2022

(54) METHOD FOR PRODUCING LUMINESCENT NANOPARTICLES

(71) Applicant: KAIVOGEN OY, Turku (FI)

(72) Inventors: Eeva Junkkari, Turku (FI); Terhi Riuttamäki, Turku (FI); Johanna Pyylampi, Turku (FI); Jarkko Karvinen, Kaarina (FI); Antti Pihlava, Turku (FI)

(73) Assignee: KAIVOGEN OY, Turku (FI)

( * ) Notice: Subject to any disclaimer, the term of this patent is extended or adjusted under 35 U.S.C. 154(b) by 100 days.

(21) Appl. No.: 16/094,218

(22) PCT Filed: Mar. 10, 2017

(86) PCT No.: PCT/FI2017/050157
§ 371 (c)(1),
(2) Date: Oct. 17, 2018

(87) PCT Pub. No.: WO2017/182695
PCT Pub. Date: Oct. 26, 2017

(65) Prior Publication Data
US 2019/0093012 A1    Mar. 28, 2019

(30) Foreign Application Priority Data
Apr. 18, 2016 (FI) .................................. 20165340

(51) Int. Cl.
C09K 11/77 (2006.01)
B82Y 20/00 (2011.01)
B82Y 40/00 (2011.01)

(52) U.S. Cl.
CPC ........... *C09K 11/7773* (2013.01); *B82Y 20/00* (2013.01); *B82Y 40/00* (2013.01)

(58) Field of Classification Search
CPC .................................................. C09K 11/7773
See application file for complete search history.

(56) References Cited

U.S. PATENT DOCUMENTS

| | | |
|---|---|---|
| 2014/0261031 A1 | 9/2014 | Kellar |
| 2014/0273246 A1 | 9/2014 | Bisso et al. |
| 2015/0252259 A1* | 9/2015 | Jin ..................... A61K 49/0093 250/459.1 |

FOREIGN PATENT DOCUMENTS

| | | |
|---|---|---|
| WO | 2012091778 A2 | 7/2012 |
| WO | 2017182695 A1 | 10/2017 |

OTHER PUBLICATIONS

Chan. MMP2-sensing up-conversion nanoparticle for fluorescence biosensing in head and neck cancer cells.Biosensors and Bioelectronics vol. 80, Jun. 15, 2016, pp. 131-139 (Year: 2016).*

(Continued)

*Primary Examiner* — Matthew E. Hoban
(74) *Attorney, Agent, or Firm* — Jacob Eisenberg

(57) ABSTRACT

The present invention relates to a method for producing luminescent nanoparticles wherein particle size of the nanoparticles is controlled. The method of the present invention includes admixing two or more rare earth metal salts in a first solvent and an organic oil to form a reaction mixture, and subjecting the reaction mixture to an inert gas so that flow rate of the inert gas is at least 2-5 L/h and pressure in the reaction vessel is at least 50 Pa over atmospheric pressure, preferably 50-80 Pa over atmospheric pressure.

3 Claims, 5 Drawing Sheets

(56) References Cited

OTHER PUBLICATIONS

Yi. Synthesis of Hexagonal-Phase NaYF4:Yb,Er and NaYF4:Yb,Tm Nanocrystals with Efficient Up-Conversion Fluorescence. Adv. Funct. Mater. 2006, 16, 2324-2329 (Year: 2006).*

Sigma Aldrich. Product Sheet for 1-Octadecene technical grade 90%. Retrieved from https://www.sigmaaldrich.com/US/en/product/aldrich/o806 on Feb. 3, 2022 (Year: 2022).*

Wang F. et. al. (2010). Simultaneous phase and size control of upconversion nanocrystals through lanthanide doping, Nature vol. 463 Issue 7284, Letters, Feb. 25, 2010, pp. 1061-1065. doi:10.1038/nature08777.

Huang W., et. al. (2012). Controlled synthesis of NaYF4 nanoparticles and upconversion properties of NaYF4:Yb, Er (Tm)/FC transparent nanocomposite thin films, Science Direct—Journal of Colloid and Interface Science, pp. 34-39. doi:10.1016/j-jcis.2012.02.047.

Schäfer H., et. al. (2009) Synthesis of Hexagonal Yb3R,Er3R-Doped NaYF4 Nanocrystals at Low Temperature, Advanced Functional Materials vol. 19, pp. 3091-3097. doi: 10.1002/adfm.200900642.

Wang W., et. al., (2013). Graphene supported βNaYF4:Yb3+,Tm3+ and N doped P25 nanocomposite as an advanced NIR and sunlight driven upconversion photocatalyst, Science Direct, Applied Surface Science 282, pp. 832-837. https://doi.org/10.1016/j.apsusc.2013.06.066.

Chan Y., et. al., (2016). MMP2-sensing up-conversion-nanoparticlefor fluorescencebiosensing in headandneckcancercells, Science Direct, Biosensors and Bioelectronics 80, pp. 131-139. https://doi.org/10.1016/i.bios.2016.01.049.

Li Z. and Zhang Y. (2008). An efficient and user-friendly method for the synthesis of hexagonal-phase NaYF4:Yb, Er/Tm nanocrystals with controllable shape and upconversion fluorescence, IOP publishing, Nanotechnology, vol. 19, No. 34. doi: 10.1088/0957-4484/19/34/345606.

* cited by examiner

METHOD FOR PRODUCING LUMINESCENT NANOPARTICLES

FIELD

The present invention relates to a method for producing luminescent nanoparticles, in particular to a method wherein properties of the nanoparticles are controlled.

BACKGROUND

Upconversion luminescence, also so called anti-Stokes photoluminescence, is a unique phenomenon in which lower energy, typically infrared (IR) excitation light is converted to higher energy visible emission light. Only certain materials possess the capability of efficient photon upconversion, i.e. anti-Stokes photoluminescence by sequential absorption of multiple photons. They are inorganic crystals and nanocrystals which contain trivalent lanthanide ions as dopants. Together with scandium and yttrium these elements are called rare earth elements. The most typical lanthanides used as dopants in photon upconverting materials are ytterbium, erbium, thulium and holmium, but also e.g. praseodymium, neodymium, cerium, europium, samarium and terbium have been used. The upconversion can be enhanced by adding a sensitizer ion, most commonly ytterbium, which absorbs the excitation energy and transfers it resonantly to the activator. The dopants provide luminescent centers when their concentration in the particle is small enough (from less than one mol-% to few tens of mol-%) to prevent concentration quenching, but yet at least a minimum concentration is required to enable adequate adsorption by sensitizer and energy-transfer between dope-ions, i.e. from sensitizer to activator ions.

The luminescence of upconverting materials depends not only on the dopant ions and their concentration and ratio, but also on the host material, i.e. the host lattice itself. The host lattice determines the distance and spatial position between the dopant ions. The host material should have low phonon energies to prevent nonradiative energy loss and to maximize the radiative emission, and the inorganic ions should have about the same ionic size as lanthanides. Oxides exhibit high phonon energies, while chlorides, bromides, fluorides and iodides have low phonon energies. Fluorides are the most used host materials because they also are chemically the most stable. Cations like $Na^+$, $K^+$, $Ca^{2+}$, $Y^{3+}$, $Sr^{2+}Ba^{2+}$, $Zr^{2+}$ and $Ti^4$ have ionic radii close to lanthanides. The most efficient upconverting material to date is $NaYF_4$ doped with $Yb^{3+}$ and $Er^{3+}$. Also, the crystal structure has an effect on luminescence efficiency: hexagonal crystal produces approximately 10 times stronger luminescence than cubic crystal.

Nano sized inorganic upconverting particles can be synthesized by many methods. Sunstone Upconverting Nanocrystals with slightly rod like shape and average diameter of 40 nm are also commercially available with e.g. carboxylated surface or coated with avidin from Sigma Aldrich (St. Louis, Mo.).

The upconverting nanoparticles (UCNPs), also called as nano-sized upconverting phosphors (UCPs) have been synthesized using several methods, from which the most commonly used processes are co-precipitation, thermal decomposition, crystallization in high-boiling point organic solvent, and hydro- and solvothermal methods.

Wang et al. (Nature 2010; 463: 1061-1065) disclosed a simple method for preparing UCNPs, where the colloidally stable nano-sized $NaYF_4$: $Yb^{3+}$, $Er^{3+}$ particles were synthesized in organic oils. According to the method lanthanide chlorides in methanol were mixed with oleic acid and 1-octadecene, and the solution was heated to 160° C. for 30 min and then cooled down to room temperature. Thereafter, methanol solution of $NH_4F$ and NaOH was added and the mixture was stirred for 30 min. After the methanol evaporated, the solution was heated under argon to 300° C. for 1.5 h and cooled down to room temperature. The resulting nanoparticles were washed several times and re-dispersed in cyclohexane.

UCNPs for bioanalytical applications should be monodisperse, well-shaped, water-dispersible and phase-pure nanocrystals with uniform size, preferably <50 nm with intense luminescence. In addition, they must be further derivatized to allow biomolecule conjugation. A typical procedure is to grow a silica shell containing functional groups for biomolecule attachment around the UCNPs.

A challenge in the use of UCNPs as labels in bioanalytical applications is that they are prone to aggregation during their preparation. In addition, UCNPs may be formed as cubic crystals that are known to produce significantly lower luminescence than the desired hexagonal crystals. Furthermore, the UCNPs should be as luminescent as possible. Several parameters affect the luminescence properties. One major factor is the particle size: the larger the particle, the smaller the surface-to-volume ratio and the brighter the luminescence. Accordingly, there is still need for further improvement of UCNP synthesis.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following description presents some concepts of the invention in a simplified form as a prelude to a more detailed description of exemplifying embodiments of the invention.

The present invention is based on the observation that the luminescence intensity of the UCNPs is dependent on the particle size, and that the particle size is dependent on the reaction conditions where the UCNPs are prepared.

It is thus an object of the present invention to provide a method for preparing upconverting nanoparticles, the method including steps of:
  admixing two or more rare earth salts in a first solvent and an organic oil, to form a reaction mixture in a reaction vessel, and
  subjecting the reaction mixture to a flow of an inert gas, wherein flow rate of the inert gas is 2-5 L/h, preferably 4-5 L/h, most preferably 4.8 L/h, and wherein pressure in the reaction vessel is at least 50 Pa over atmospheric pressure, preferably 50-80 Pa over atmospheric pressure.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

DESCRIPTION

The present disclosure concerns a method for producing upconverting nanoparticles (UCNPs), the method including steps of:
- admixing two or more rare earth salts in a first solvent and an organic oil, to form a reaction mixture in a reaction vessel, and
- subjecting the reaction mixture to a flow of an inert gas, wherein flow rate of the inert gas is 2-5 L/h, preferably 4-5 L/h, most preferably 4.8 L/h, and wherein pressure in the reaction vessel is at least 50 Pa over atmospheric pressure, preferably 50-80 Pa over atmospheric pressure.

Figure 1:
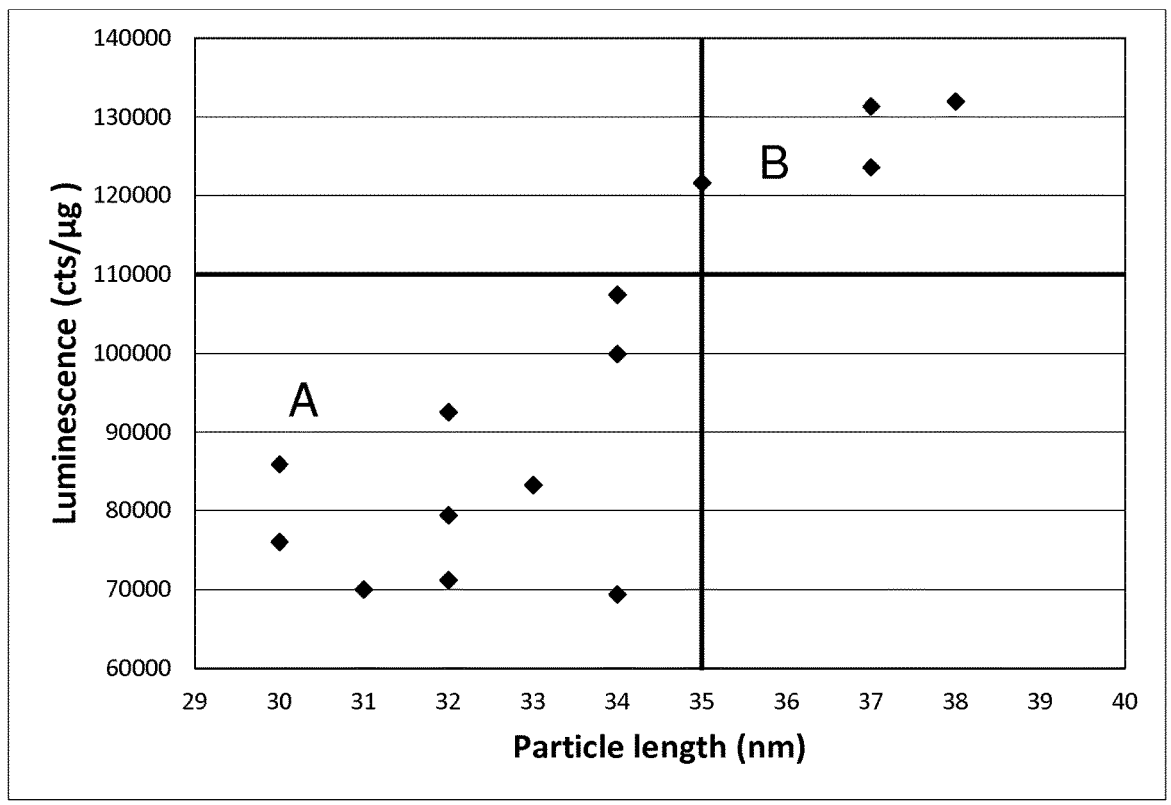
FIGS. 1 and 2 show the correlation between the particle size (length and width) and luminescence intensity of $NaYF_4$: $Yb^{3+}$, $Er^{3+}$ particles.
Figure 2:
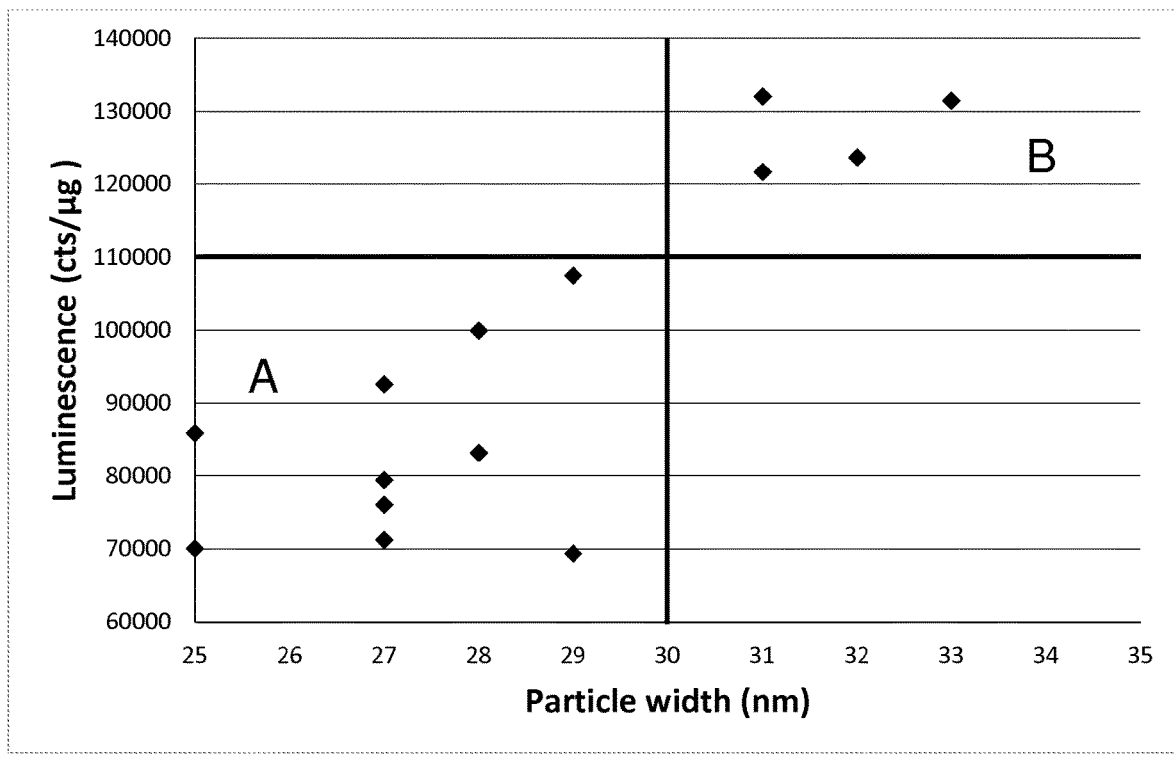
Figure 3:
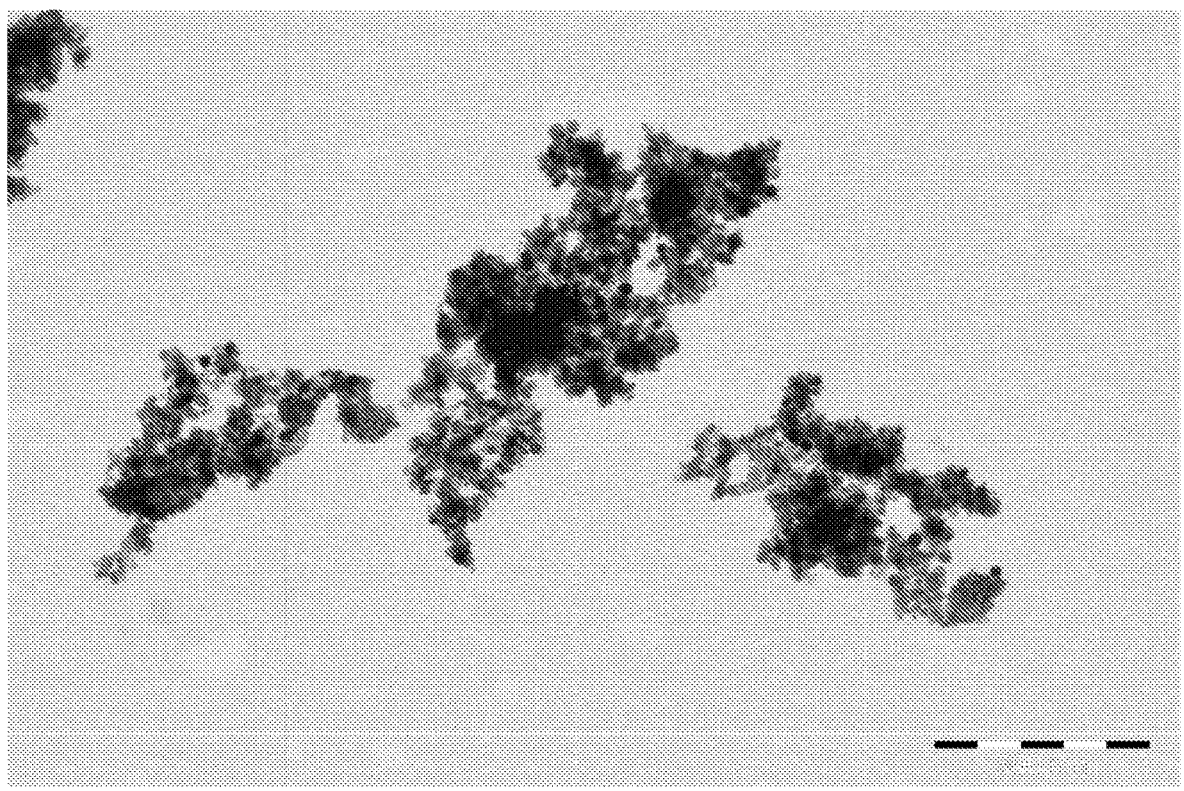
FIGS. 3-9 show TEM images of $NaYF_4$: $Yb^{3+}$, $Er^{3+}$ particles prepared according to Examples 1-7, respectively. Scale bar=500 nm (FIG. 3) or 200 nm (FIGS. 4-9).
Figure 4:
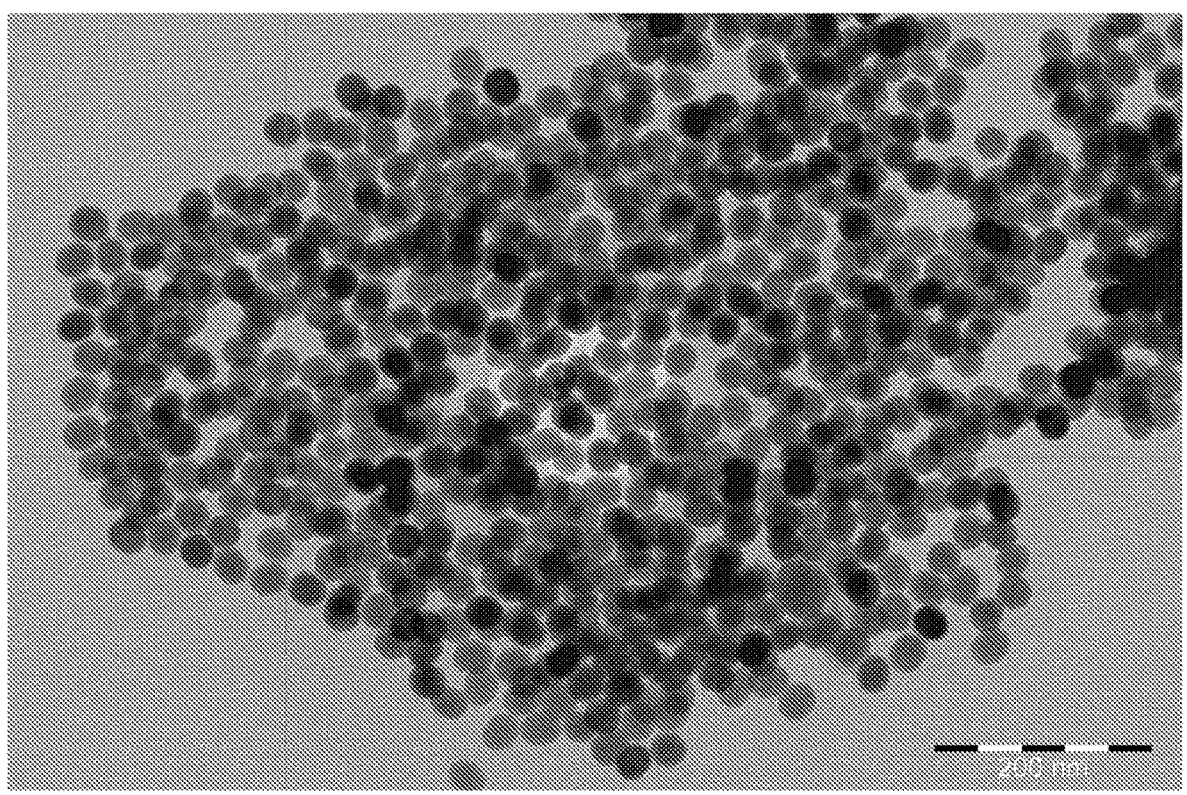
Figure 5:
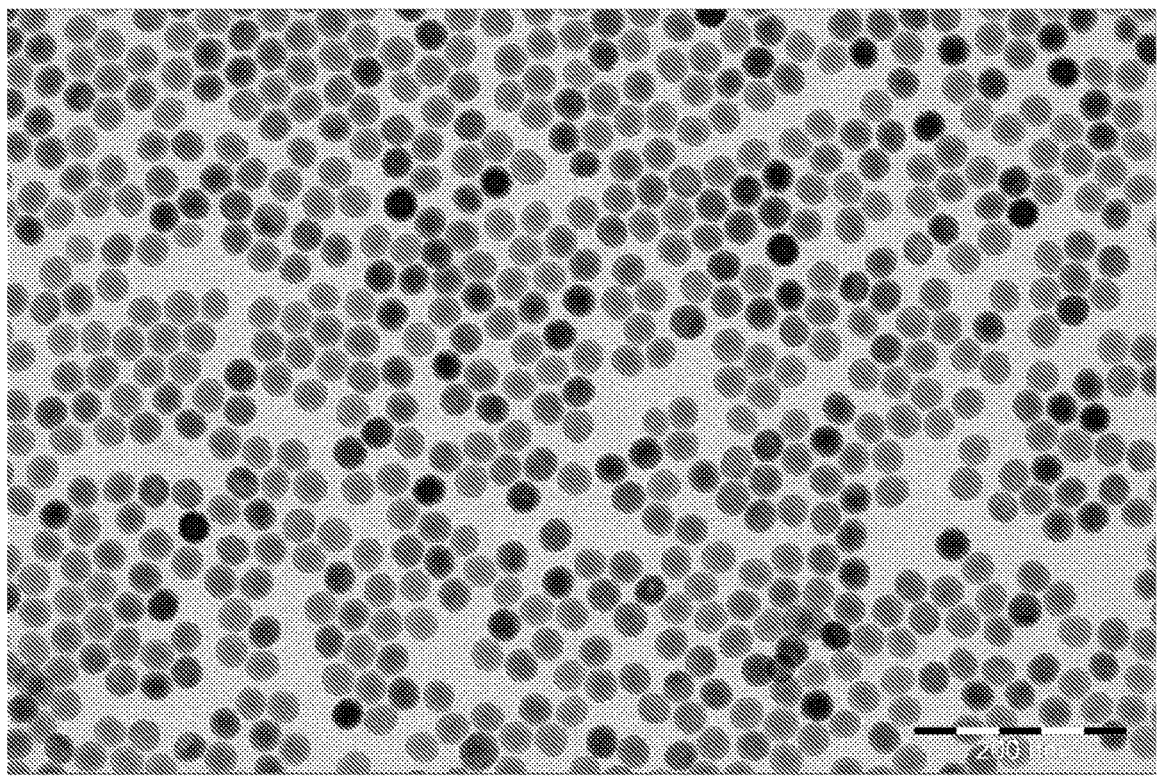
Figure 6:
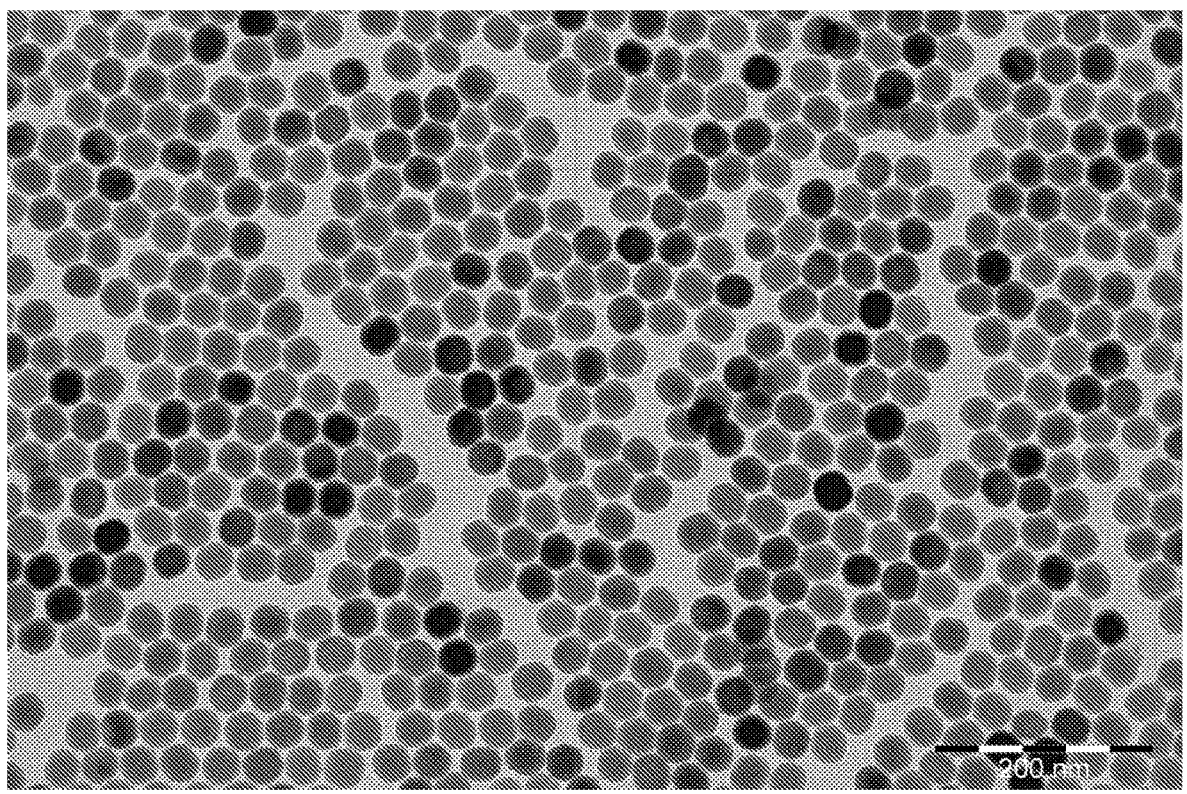
Figure 7:
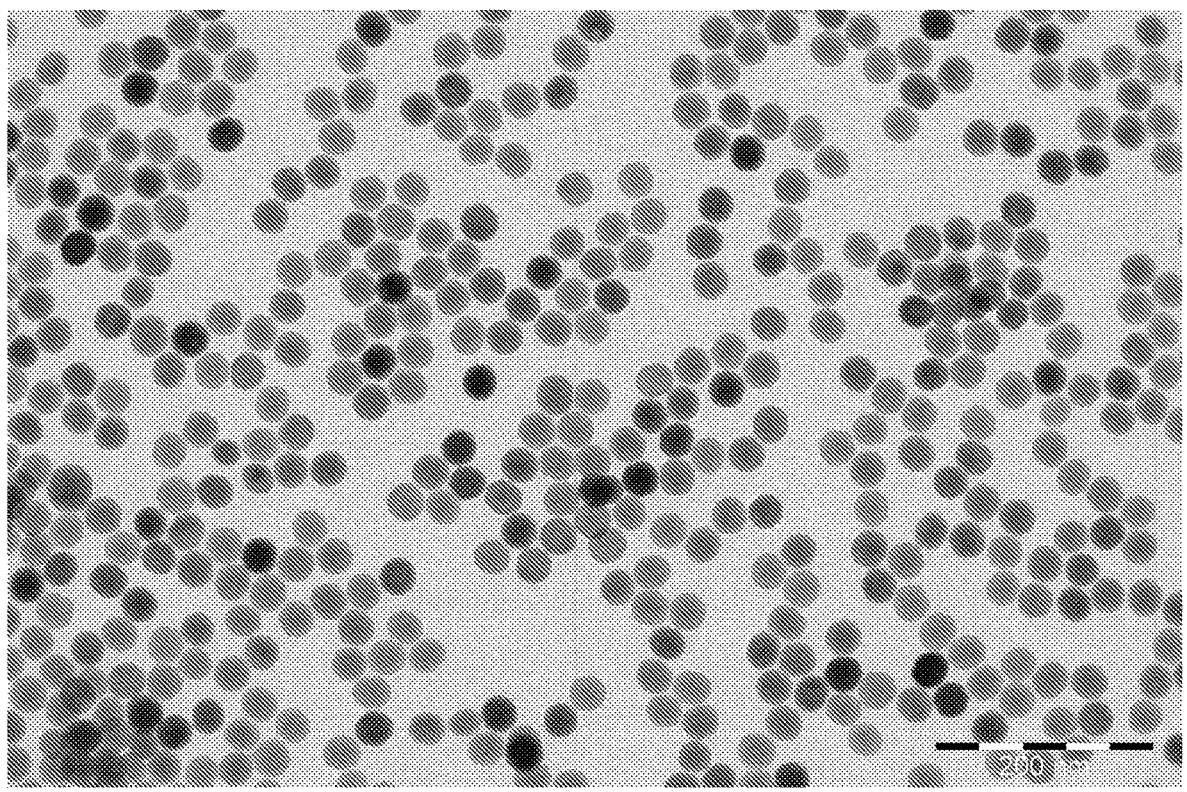
Figure 8:
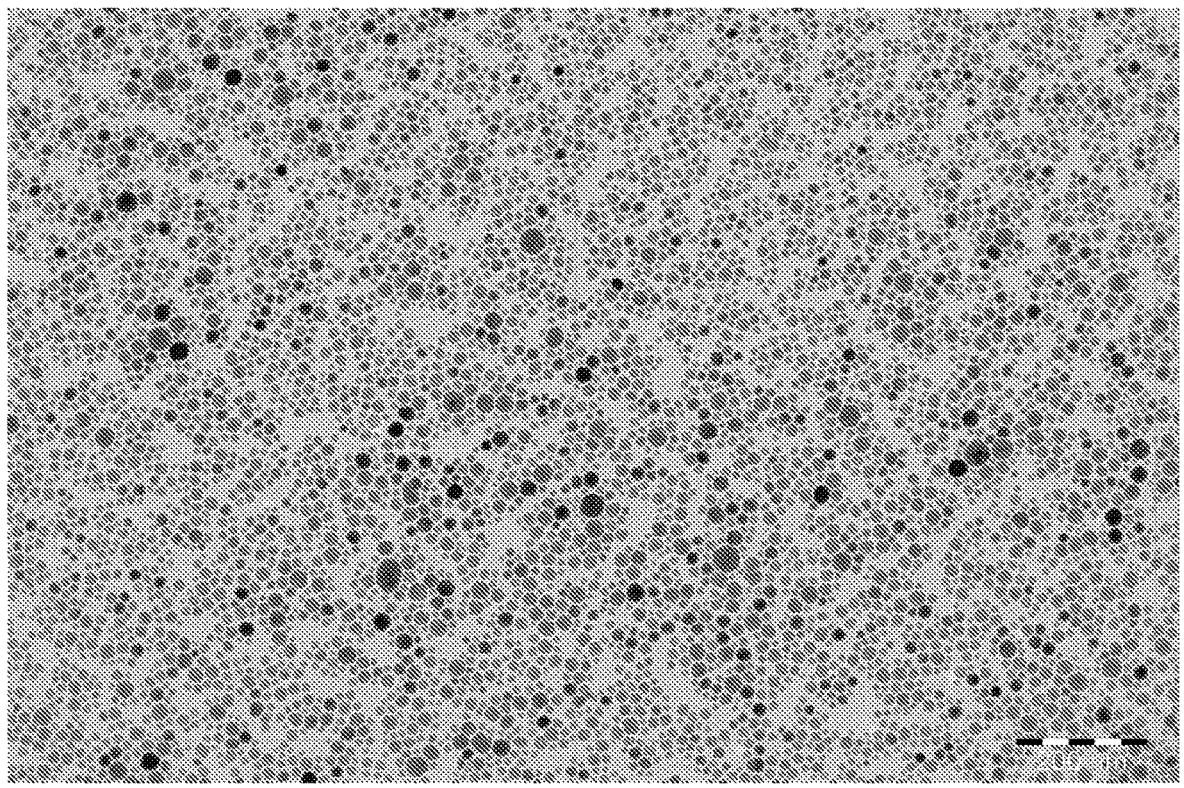
Figure 9:
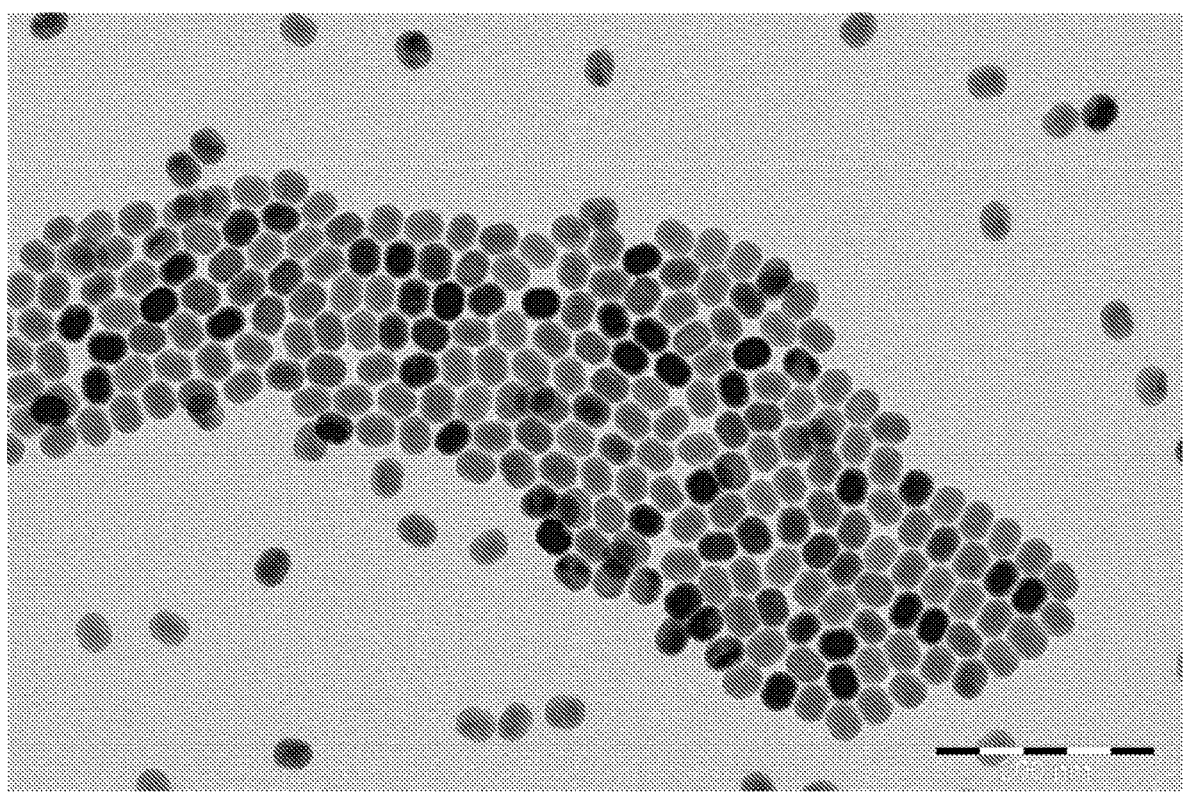

FIGS. 1 and 2 and Table 1 show the effect of flow rate in the method for producing an exemplary UCNP, namely $NaYF_4$: $Yb^{3+}$, $Er^{3+}$, on the particle size and luminescence intensity. In the figures, the particles in the quarter space A were prepared by using flow rate 5.2 L/h, and the particles in the quarter space B were prepared by using identical reaction conditions but with flow rate of 4.8 L/h. Accordingly, the UCNPs prepared according to the present invention were larger in size and therefore more luminescent than the ones prepared by using a higher flow rate.

FIGS. 3-9 show exemplary TEM images of $NaYF_4$: $Yb^{3+}$, $Er^{3+}$ particles prepared by using various flow rates of the inert gas. The results are summarized in Table 2. Accordingly, in order to prevent or at least reduce aggregation, the flow rate of the inert gas should be at least 4 L/h, preferably 4.8 L/h.

When the pressure in the reaction vessel is 50 Pa or more over the atmospheric pressure, the flow rate can be reduced, but it should be at least 2 L/h. The volume of the reaction vessel and especially the width of the exit port (outlet) affects the pressure in the reaction vessel while keeping the flow rate of the inert gas constant.

In order to obtain optimal particles, i.e. to attain optimal particle size and intense luminescence, and to avoid aggregation and the formation of undesired cubic crystals, the flow rate of the inert gas should be 2-5 L/h, and the pressure in the reaction vessel should be at least 50 Pa, preferably 50-75 Pa over the atmospheric pressure 0.1 MPa.

The first solvent is preferably a lower alcohol such as methanol, ethanol or propanol or their mixture, most preferably methanol. The organic oil is preferably a mixture of oleic acid and 1-octadecene or a mixture of 1-octadecene and oleylamine, or oleylamine alone. A preferable molar ratio of oleic acid and 1-octadecene is 0.3 and 0.7, respectively.

The rare earths are preferably selected from a group consisting of yttrium, ytterbium, erbium, thulium, holmium, praseodymium, neodymium, cerium, samarium and terbium, preferably from thulium, yttrium, erbium and ytterbium, more preferably yttrium, ytterbium, erbium or thulium. A preferable salt is a halide salt, most preferably chloride salt. According to an exemplary embodiment the two or more rare earth salts are $YCl_3$, $YbCl_3$, and $ErCl_3$. According to an exemplary embodiment the molar ratios of the above mentioned rare earth halides are 0.80, 0.18 and 0.02, respectively. According to another exemplary embodiment, the rare-earth salts are selected from $YCl_3$, $YbCl_3$ and $TmCl_3$. According to an exemplary embodiment the molar ratios of these rare-earth halides are 0.747, 0.25 and 0.003, respectively.

Exemplary inert gases are argon, nitrogen, helium, and mixtures thereof. A preferable inert gas is argon. The inert gas can be fed over the surface of the reaction mixture in the vessel, or it can be fed into the reaction mixture. The inert gas can be fed at ambient temperature, or it can be preheated to the temperature of the reaction mixture.

According to another embodiment the method according to the present disclosure further includes heating the reaction mixture from a first temperature to a second temperature. The first temperature is preferably ambient temperature, typically 15-25° C., and the second temperature is typically 150-200° C., preferably about 160° C. According to this embodiment, the flow rate of inert gas is 2-5 L/h, preferably 4-5 L/h, most preferably 4.8 L/h.

According to another embodiment the method according to the present disclosure further includes cooling the reaction mixture from the second temperature to a third temperature. The third temperature is typically 15-60° C. According to this embodiment, the flow rate of inert gas is 2-5 L/h, preferably 4-5 L/h, most preferably 4.8 L/h.

According to another embodiment the method according to the present disclosure further includes admixing fluoride ion and sodium ion, in a second solvent, to the cooled reaction mixture and heating the mixture from the third temperature to a fourth temperature. The fourth temperature is preferably 250-350° C., more preferably about 300° C. An exemplary fourth temperature is 310° C. The fluoride ion is preferably admixed in the form of ammonium fluoride and the sodium ion as sodium hydroxide. Exemplary second solvents are lower alcohols such as methanol, ethanol and propanol and their mixtures. A preferable alcohol is methanol. The second solvent is preferably same as the first solvent. According to this embodiment, the flow rate of inert gas is 2-5 L/h, preferably 4-5 L/h, most preferably 4.8 L/h.

According to a particular embodiment, the whole method is performed under the flow of inert gas, wherein the flow rate is 2-5 L/h, preferably 4-5 L/h, most preferably 4.8 L/h.

According to another embodiment the method according to the present disclosure further includes collecting the upconverting nanoparticle. Particular upconverting nanoparticles prepared are $NaYF_4$: Yb, Er and $NaYF_4$:Yb, Tm.

An exemplary apparatus suitable for preparation of the UCNPs includes a reaction vessel, such as a three neck flask equipped with inlet and exit ports for an inert gas, a thermometer and heating means such as an electric heating mantle.

Examples

General Procedure 20 mL $RECl_3$ (0.2 M, RE=Y, Yb, Er) in methanol were added to a 500 mL flask containing 30 mL oleic acid and 70 mL 1-octadecene and the solution was heated to 160° C. for 40 min and then cooled down to room temperature. Thereafter, 50 mL methanolic solution of $NH_4F$ (16 mmol) and NaOH (10 mmol) was added, and the solution was stirred for 30 min. After methanol was evaporated, the solution was heated to 310° C. for 1.5 h and cooled down to room temperature. The resulting nanoparticles were precipitated by the addition of ethanol and collected by centrifugation. The process was performed by subjecting a flow of argon to the reaction mixture. Results are shown in Tables 1 and 2.

TABLE 1

Effect of the flow rate on the particle size and luminescence of the product.

| Flow rate L/h | batch # | luminescence[a] | particle length nm | particle width nm |
|---|---|---|---|---|
| 5.2 | 1 | 83 280 | 28 | 33 |
| 5.2 | 2 | 71 263 | 27 | 32 |
| 5.2 | 3 | 76 064 | 27 | 30 |
| 5.2 | 4 | 70 076 | 25 | 31 |
| 5.2 | 5 | 85 977 | 25 | 30 |
| 5.2 | 6 | 99 980 | 28 | 34 |
| 5.2 | 7 | 107 511 | 29 | 34 |
| 5.2 | 8 | 79 421 | 27 | 32 |
| 5.2 | 9 | 92 648 | 27 | 32 |
| 5.2 | 10 | 69 426 | 29 | 34 |
| 4.8 | 11 | 121 658 | 31 | 35 |
| 4.8 | 12 | 123 703 | 32 | 37 |
| 4.8 | 13 | 131 464 | 33 | 37 |
| 4.8 | 14 | 132 104 | 31 | 38 |

[a]counts/μg of UCNP.

TABLE 2

Effect of flow rate on the quality of the product.

| Example | Argon flow (L/h) | Quality of the product |
|---|---|---|
| 1[a] | 1.8[c] | undesired cubic crystals, aggregates |
| 2[a] | 4.8[c] | desired hexagonal crystals, some aggregates |
| 3[a] | 7.8[c] | desired hexagonal crystals, no aggregates |
| 4[a] | 1.8[c] | desired hexagonal crystals, no aggregates |
| 5[a] | 4.8[d] | desired hexagonal crystals, no aggregates |
| 6[b] | 1.8[c] | undesired cubic crystals, no aggregates |
| 7[b] | 4.8[d] | desired hexagonal crystals, no aggregates |

[a]reaction vessel 250 mL;
[b]reaction vessel 500 mL;
[c]pressure in the reaction vessel < 50 Pa over 0.1 MPa;
[d]pressure in the reaction vessel 50 Pa over 0.1 MPa;
[d]pressure in the reaction vessel 75 Pa over 0.1 MPa.

The non-limiting, specific examples provided in the description given above should not be construed as limiting the scope and/or the applicability of the appended claims.

The invention claimed is:

1. A method for producing luminescent hexagonal non-aggregated upconverting nanoparticles selected from $NaYF_4$:Yb, Er and $NaYF_4$:Yb, Tm, the method comprising steps of:
    admixing two or more rare earth salts in a first solvent, wherein the first solvent is alcohol, and an organic oil, wherein the organic oil comprises a mixture of oleic acid and 1-octadecane to form a reaction mixture in a reaction vessel,
    subjecting the reaction mixture to a flow of an inert gas, wherein flow rate of the inert gas is 4-5 L/h and pressure in the reaction vessel 50-75 Pa over atmospheric pressure,
    heating the reaction mixture from a first temperature to a second temperature, wherein the first temperature is 15-25° C., and the second temperature is 150-200° C.
    cooling the reaction mixture from the second temperature to a third temperature, wherein the third temperature is 15-60° C.,
    admixing to the reaction mixture fluoride ion and sodium ion in a second solvent, wherein the second solvent is alcohol,
    heating the reaction mixture from the third temperature to a fourth temperature, wherein the fourth temperature is 250-350° C.

2. The method according to claim 1, wherein the fluoride ion is admixed in the form of ammonium fluoride, and the sodium ion is admixed in the form of sodium hydroxide.

3. The method according to claim 1 further comprising collecting the upconverting nanoparticles.

* * * * *